(12) United States Patent
Ghiron et al.

(10) Patent No.: US 7,415,184 B2
(45) Date of Patent: Aug. 19, 2008

(54) WIDEBAND OPTICAL COUPLING INTO THIN SOI CMOS PHOTONIC INTEGRATED CIRCUIT

(75) Inventors: Margaret Ghiron, Allentown, PA (US); Prakash Gothoskar, Allentown, PA (US); John Fangman, Leesport, PA (US); Robert Keith Montgomery, Easton, PA (US); Mary Nadeau, Alburtis, PA (US)

(73) Assignee: SiOptical Inc., Allentown, PA (US)

( * ) Notice: Subject to any disclaimer, the term of this patent is extended or adjusted under 35 U.S.C. 154(b) by 0 days.

(21) Appl. No.: 11/652,348

(22) Filed: Jan. 11, 2007

(65) Prior Publication Data

US 2007/0274630 A1 Nov. 29, 2007

Related U.S. Application Data

(60) Provisional application No. 60/757,962, filed on Jan. 11, 2006.

(51) Int. Cl.
*G02B 6/10* (2006.01)
*G02B 6/12* (2006.01)
*G02B 6/32* (2006.01)
*G02B 6/26* (2006.01)
*G02B 6/30* (2006.01)

(52) U.S. Cl. .................. 385/131; 385/129; 385/130; 385/14; 385/33; 385/52; 385/49

(58) Field of Classification Search .................. 385/49, 385/52, 14, 33, 129–131
See application file for complete search history.

(56) References Cited

U.S. PATENT DOCUMENTS

| | | | |
|---|---|---|---|
| 5,168,535 A | 12/1992 | Laor | |
| 5,481,629 A | 1/1996 | Tabuchi | |
| 6,316,281 B1 * | 11/2001 | Lee et al. | 438/31 |
| 6,825,542 B2 | 11/2004 | Lam et al. | |
| 6,985,649 B2 * | 1/2006 | Fukashiro et al. | 385/16 |
| 7,013,067 B2 | 3/2006 | Ghiron et al. | |
| 7,151,738 B2 | 12/2006 | Peng | |
| 7,151,870 B2 | 12/2006 | Gu et al. | |
| 7,274,835 B2 * | 9/2007 | Panepucci et al. | 385/12 |
| 2002/0196998 A1 | 12/2002 | Steinberg et al. | |
| 2005/0089262 A1 * | 4/2005 | Jenkins et al. | 385/14 |

FOREIGN PATENT DOCUMENTS

JP 2005-070507 * 3/2005

* cited by examiner

*Primary Examiner*—Charlie Peng
(74) *Attorney, Agent, or Firm*—Wendy W. Koba

(57) ABSTRACT

An arrangement for providing optical coupling into and out of a relatively thin silicon waveguide formed in the SOI layer of an SOI structure includes a lensing element and a defined reference surface within the SOI structure for providing optical coupling in an efficient manner. The input to the waveguide may come from an optical fiber or an optical transmitting device (laser). A similar coupling arrangement may be used between a thin silicon waveguide and an output fiber (either single mode fiber or multimode fiber).

18 Claims, 5 Drawing Sheets

US 7,415,184 B2

WIDEBAND OPTICAL COUPLING INTO THIN SOI CMOS PHOTONIC INTEGRATED CIRCUIT

CROSS-REFERENCE TO RELATED APPLICATION

This application claims the benefit of U.S. Provisional Application No. 60/757,962, filed Jan. 11, 2006.

TECHNICAL FIELD

The present invention relates to an apparatus for providing coupling into and out of a thin (i.e., sub-micron dimensioned) optical waveguide and, more particularly, to the use of reference planes and lensing elements to provide coupling between a fiber or lens and a thin waveguide.

BACKGROUND OF THE INVENTION

A common prior art technique for coupling light from an external source to a silicon waveguide is to cleave or polish end facets on both the waveguide and the mating fiber termination. Examples of fiber terminations include, but are not limited to: multimode or single-mode fibers with small or zero cleave/polish angles, and specially-shaped or lensed single-mode fibers that produce spot sizes as small as 1.5 µm. The fiber termination is aligned to allow maximum light transmission through the waveguide, and then fixed in position. Anti-reflection (AR) coatings can be used on both the fiber termination and the waveguide facet to reduce the Fresnel losses. In all of these prior art arrangements, the input and output ports are necessarily located at edge facets of the waveguiding-containing wafer die, significant restrictions on device geometry (e.g., topology and/or size) are imposed by using this prior art edge coupling constraint.

Another factor associated with optical coupling is the development and use of extremely "thin" waveguides formed within the SOI layer of an SOI-based opto-electronic arrangement. For the purposes of the present invention, a "thin" waveguide is defined as having a typical width on the order of approximately 0.5 µm and a typical thickness on the order of approximately 0.15 µm. In the past, "nanotapers" or "inverse tapers" have been successfully used with thin waveguides. However, this success has been shown only within research/development environments, where there is careful control over fabrication conditions.

Thus, a need remains in the art for a manufacturable, high efficiency optical coupling arrangement for providing permanent coupling of lasers and fibers into thin, SOI-based optical waveguides as utilized will be required for high volume production of opto-electronic products.

SUMMARY OF THE INVENTION

The need remaining in the art is addressed by the present invention, which relates to an apparatus for providing coupling into and out of a thin (i.e., sub-micron dimensioned) optical waveguide formed in the surface SOI layer of an SOI structure and, more particularly, to the use of reference planes within the SOI structure itself and associated lensing elements to provide coupling between a fiber or laser and a thin waveguide.

In accordance with the present invention, a defined interface within an SOI structure (such as, for example, the interface between the silicon substrate and the overlying buried oxide (BOX) layer) is utilized as a reference plane for the coupling arrangement. The thin waveguide is formed within the SOI layer and terminates at a sidewall formed within the SOI structure, with a lensing arrangement utilized to provide coupling between the input device and the waveguide.

In one embodiment of the present invention, a separate lens element is disposed between the light source (either fiber or laser) and the sidewall termination of the thin waveguide. The lens is held within a fixture disposed in a trench that has been etched into the SOI structure. The fixture itself includes a reference surface that is associated with the SOI-based reference plane so that the lens will be in optical alignment with the thin waveguide when the fixture is placed in the trench. In an "active alignment" configuration of this embodiment, the lateral displace of the lens fixture with respect to the waveguide termination can be adjusted by moving the fixture along the lateral extent of the trench until maximum optical coupling is obtained. Permanent attachment is made once maximum coupling is achieved.

In an alternative embodiment, a lensing arrangement may be directly integrated with the optical source, such as a lensed fiber or a laser comprising an integral lens. In the case of a lensed fiber, the fiber is first be positioned within a separate block component (preferably a silicon block) that is mounted over the SOI structure. The silicon block is formed to include an accurately-positioned V-groove that will support the fiber such that the core is in the desired position to provide coupling to the thin waveguide. The silicon block is "flip chip" attached to the SOI structure to form the permanent coupling arrangement, using the substrate/BOX reference plane for optical alignment between the fiber's core and the thin waveguide.

In any of the embodiments of the present invention, a portion of the in-coupled signal propagating along the thin waveguide may be tapped off and used to as an active feedback signal to adjust the alignment between the laser/fiber and thin waveguide until maximum coupling has been achieved. Additionally, the same types of alignment arrangements may be used to out-couple a signal propagating along a thin waveguide into an output fiber, or other optical output device (such as, for example, a photodiode).

Other and further embodiments and features of the present invention will become apparent during the course of the following discussion and by reference to the accompany drawings.

BRIEF DESCRIPTION OF THE DRAWINGS

Referring now to the drawings.

DETAILED DESCRIPTION

Figure 1:
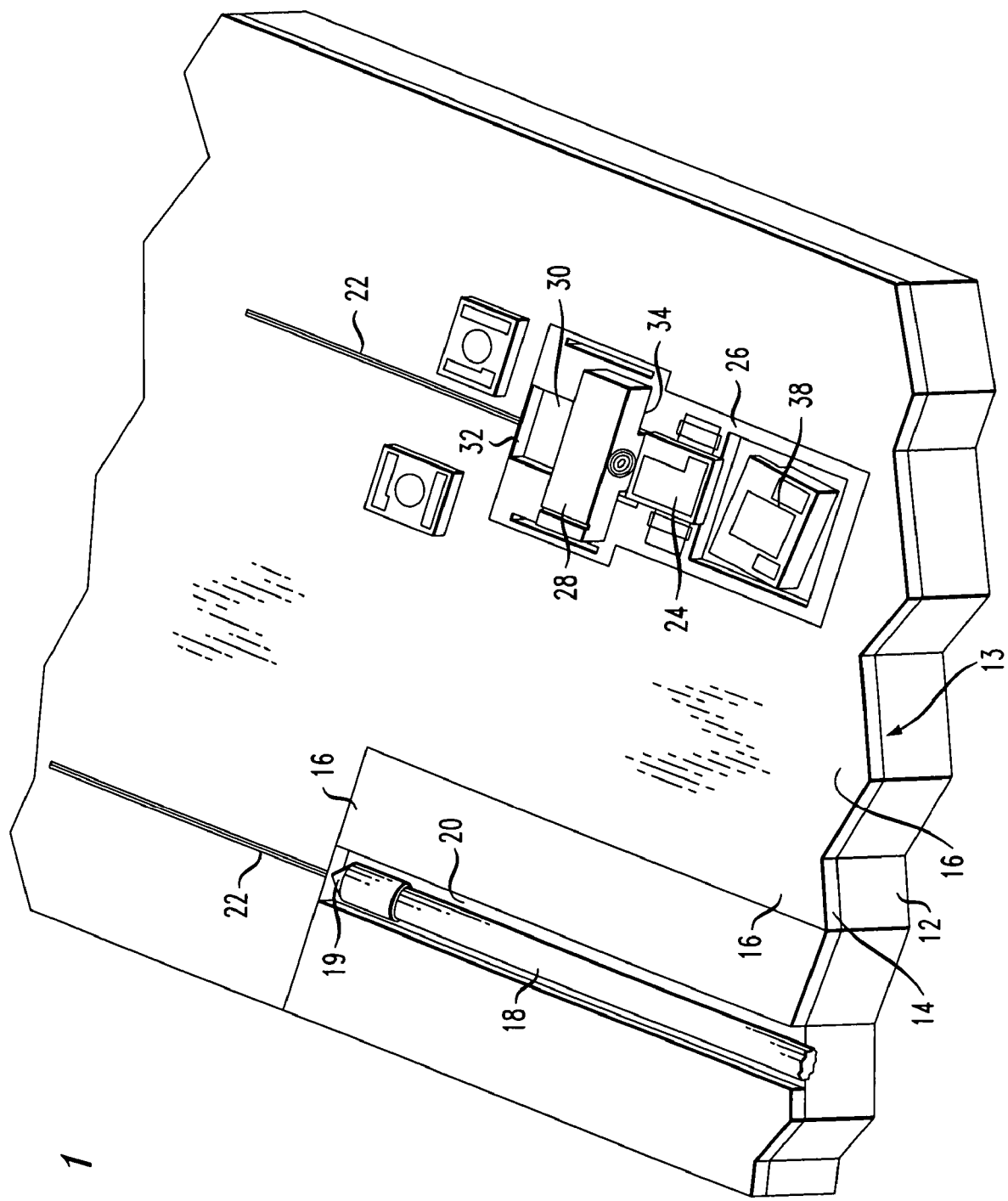
FIG. 1 is an isometric view of an exemplary SOI structure including both a fiber-based coupling arrangement and a laser-based coupling arrangement formed in accordance with the present invention.

FIG. 1 is an isometric view of an exemplary SOI structure 10 formed to include both a fiber coupling arrangement and a laser coupling arrangement of the present invention. It is to be understood that any number of fiber-based couplings and/or laser-based couplings may be utilized on a given SOI structure. The pair of couplings is shown here only for the sake of discussion and explanation.

As shown, SOI structure 10 comprises a silicon substrate 12, a buried oxide (BOX) layer 14 and a sub-micron thick, single crystal silicon surface layer 16 (hereinafter referred to as "SOI layer 16"). It is an important feature of the present invention that by utilizing a sub-micron dimensioned optical waveguide within SOI layer 16, the nanotaper coupling arrangement can be configured to be essentially polarization independent. That is, both the TE and TM optical modes will couple into the waveguide with essentially the same coupling efficiency. One exemplary configuration (for use in association with a propagating wavelength of 1310 nm) utilizes an SOI layer 16 having a thickness of approximately 140 nm and a nanotaper tip width of 180-200 nm. By utilizing an associated lens system with a mode field diameter of 2.5 µm, the TE and TM modes will couple into the nanotaper tip with nearly the same efficiency (e.g., less than 1 dB polarization dependent loss). It is to be understood that other SOI layer thicknesses and nanotaper tip widths (with associated adjustments in mode field diameter) may be utilized to achieve acceptable polarization independent performance. Polarization independent coupling is an important advantage for applications where a photodetector is to be utilized in association with the waveguide, inasmuch as the photodetector will be able to achieve fixed responsivity with randomly polarized single mode input coupled light.

In accordance with the present invention, a selected interface between contiguous layers of the SOI structure is utilized as a reference surface to provide alignment between an input element (such as a fiber or laser) and a relatively thin waveguide formed in SOI layer 16. Preferably, the interface between silicon substrate 12 and BOX 14 is defined as the reference plane (hereinafter designated as reference plane 13) inasmuch as the location of this interface does not vary greatly from wafer to wafer. Using this interface as the reference plane, the distance between reference plane 13 and the location of the thin waveguide within SOI layer 16 can be determined and will remain essentially constant. It is to be understood, however, that the interface between any contiguous layers within the structure may be used as a "reference plane", such as the top of SOI layer 16 itself. Moreover, as other layers are added to the SOI structure during processing (such as, for example, CMOS interlevel dielectric layers), any of the interfaces between these layers may also be used as the reference plane.

Referring to FIG. 1, an optical fiber 18 is illustrated as positioned within a trench 20 formed through the thickness of SOI structure 10. In this example, optical fiber 18 includes a lensed endface 19 to improve the coupling efficiency between optical fiber 18 and a thin waveguide 22 formed within SOI layer 16. The alignment between lensed endface 19 of fiber 18 and thin waveguide 22 is provided by a fiber-holding fixture (not shown in this view) that overlies the SOI structure, using reference plane 13 to determine the dimensions required to provide alignment. The particular aspects of the fiber-holding fixture are illustrated and described hereinbelow in associated with FIGS. 2-5.

Also shown in FIG. 1 is a laser source 24 which is disposed on a relatively thin recess 26 formed within SOI structure 10. A lensing fixture 28 is positioned between the output of laser source 24 and thin waveguide 22 to provide the required high efficiency coupling of the laser's output signal into thin waveguide 22. In accordance with the present invention, a lensing fixture 28 is positioned to span a relatively deep trench 30 formed between thin recess 26 and a waveguide termination sidewall 32. In particular, lensing fixture 28 is formed to include a reference surface 34 that contacts the reference plane formed by SOI layer 16, with the width of surface 34 sufficent to span deep trench 30. Importantly, lensing component 36 within lensing fixture 28 is formed with respect to reference surface 34 so as to be in alignment with waveguide 22 when in position. A backface monitor 38 may be used in association with laser source 24 to receive the energy exiting the rear facet of laser source 24 and provide feedback/control information for proper biasing of laser source 24.

Figure 2:
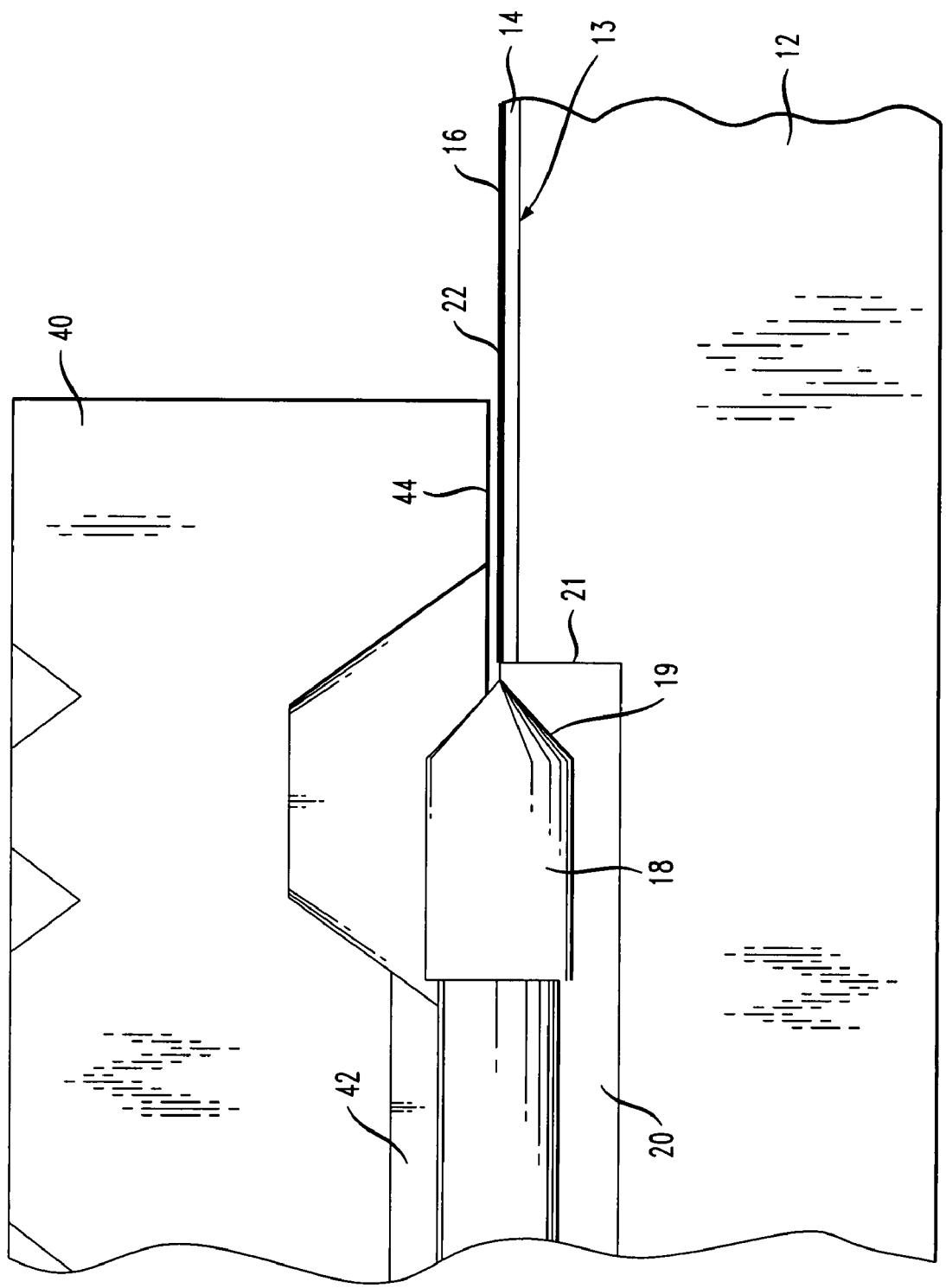
FIG. 2 is an enlarged side view of an exemplary fiber coupling arrangement formed in accordance with the present invention.

FIG. 2 is an enlarged side view of an exemplary fiber coupling arrangement formed in accordance with the present invention. Shown again in this view is optical fiber 18, including lensed endface 19. SOI structure 10, including silicon substrate 12, thin BOX layer 14 and SOI layer 16 is also shown, where thin waveguide 22 is formed within SOI layer 16 and fiber 18 is positioned so that lensed endface 19 is in optical alignment with thin waveguide 22. In accordance with the present invention, a fiber-holding block 40 is used to provide this desired alignment, while holding fiber 18 in a fixed position within a V-groove 42 formed in block 40. In preferred structures, block 40 comprises silicon and may variously be referred to hereinafter as "silicon block 40". In the particular view of FIG. 2, a top surface 44 of block 40 is utilized as a reference surface that is maintained a predetermined distance above reference plane 13 of SOI structure 10 when block 40 is mounted over SOI structure 10. by controlling the depth of V-groove 42 with respect to reference surface 44, therefore, an arrangement is formed where the tip of lensed endface 19 will be aligned with thin waveguide 22 when block 40 is positioned in place. A thin layer of any type of well-known bonding or epoxy material may be used to permanently attach block 40 to SOI structure 10. As mentioned above, block 40 is preferably formed of silicon, which matches the material composition of SOI structure 10. As a result, the components will maintain their alignment over an extended period of time, since they have matched coefficients of thermal expansion (CTE). It is to be understood, however, that other materials (such as plastics) may be used to form block 40, where a slight mismatch of CTEs may be irrelevant for certain applications.

Figure 3:
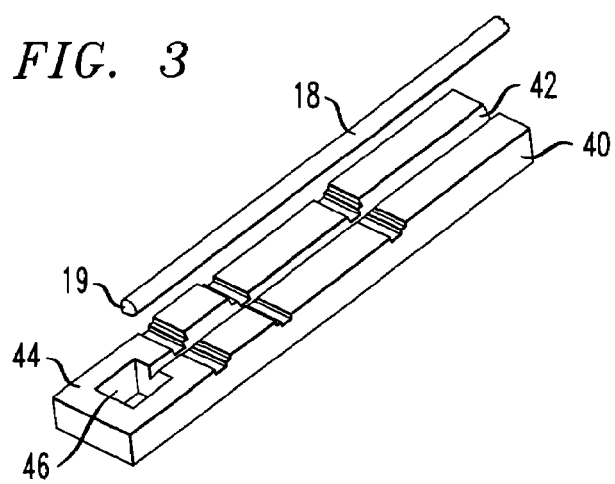
FIG. 3 is an exploded isometric view of the silicon block portion of the fiber coupling arrangement and an associated optical fiber.

FIG. 3 is an exploded isometric view of silicon block 40 and associated optical fiber 18. Evident in this view is the location and position of V-groove 42 along the extent of silicon block 40. It is well-known in the CMOS processing art that a V-groove may be formed in silicon by anisotropically etching the [011] crystallographic plane surface of a silicon substrate. For this reason as well, therefore, it is preferred that silicon be used as the material for block 40. The actual dimensions of the V-groove can be controlled to sub-micron tolerances by controlling the width of the V-groove etch. Also shown in FIG. 3 is a relatively deep trench 46 formed at the termination of V-groove 42, in the position where lensed endface 19 rests. In embodiments where a lensed fiber is not used, a separate lensing element, such as that described above in association with the laser source, may be positioned and used to provide the desired high efficiency alignment.

Figure 4:
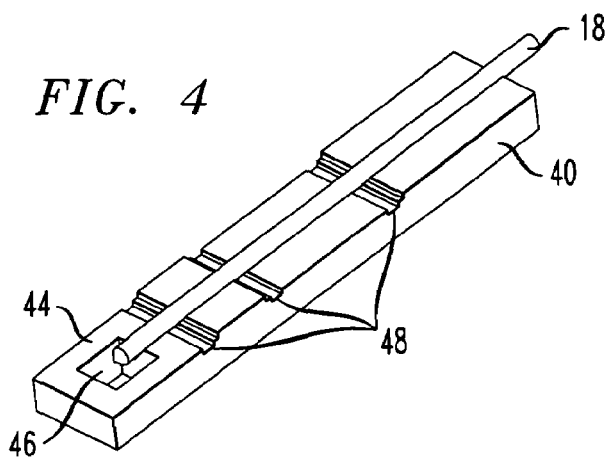
FIG. 4 is an isometric view of the silicon block of FIG. 3, with the fiber positioned within the block's V-groove.
Figure 5:
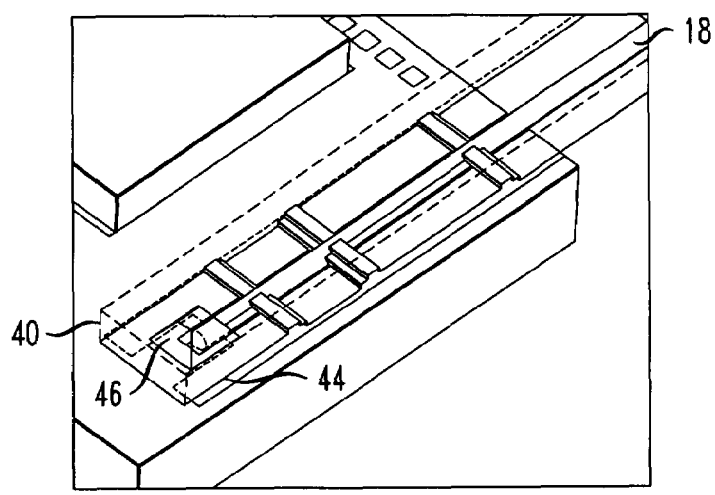
FIG. 5 is an isometric view of the silicon block of FIG. 4 in place over an SOI structure including a thin waveguide to which the fiber is to be aligned.

FIG. 4 is a similar view of silicon block 40 and fiber 18, in this case with fiber 18 disposed within, and fixed to, V-groove 42. A plurality of attachment fixtures 48 are also shown, where fixtures 48 are used to provide the actual mechanical alignment and attachment of block 40 to SOI structure 10. FIG. 5 is an isometric view of silicon block 40 in place over SOI structure 10, where it is particularly shown that reference surface 44 of block 40 is disposed over and attached to SOI structure 10, using reference plane 13 as the reference surface for alignment purposes in accordance with the present invention. It is to be understood that this type of coupling arrangement may be utilized with either an input fiber or an output fiber (or both). In particular, when the output fiber is a multimode fiber having a relatively large core area and numerical aperture, it is possible to achieve acceptable coupling efficiency without including a lens (either integrated or discrete) between the waveguide output and the fiber endface. Additionally, for multi-mode output fiber, the multi-mode fiber may be attached to trench 20 since the alignment accuracy required is on the order of +/−20 μm, thus eliminating the need for a separate block component 40 to provide alignment.

Figure 6:
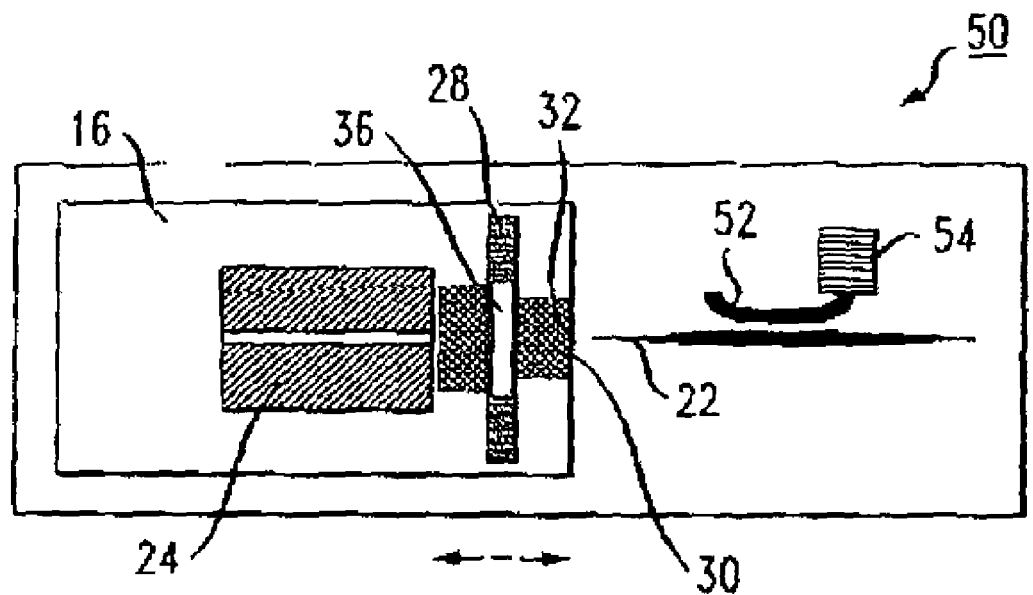
FIG. 6 is a simplified top view of an exemplary laser coupling arrangement formed in accordance with the present invention.

FIG. 6 is a simplified top view of an exemplary laser coupling arrangement formed in accordance with the present invention. As shown, laser source 24 is disposed on a shallow trench 16 formed through SOI structure 10 (for example, a trench having a thickness on the order of 10 μm). In order to improve coupling efficiency, the laser source is preferably mounted "emitter stripe down" (i.e., towards the reference plane). This configuration eliminates the vertical tolerancing problems that would otherwise arise associated with thickness variations of the laser chip itself. Lensing fixture 28 is positioned within deep trench 30 (on the order of, approximately, 100 μm). Both trenches 16 and 30 may be formed using a conventional reactive ion etch (RIE) process, where a "deep RIE" process is preferably used to form trench 30. As shown, trench 30 terminates at a sidewall 32, with waveguide 22 also terminating at sidewall 32. Particularly evident in this view is the positioning of reference plane 13 at the interface between silicon substrate 12 and BOX layer 14 (as mentioned above, other layers may be used to define as a reference plane, such as the interface between BOX layer 14 and SOI layer 16 or, alternatively, the top surface layer of SOI layer 16). Regardless of the interface used to provide a reference plane, as long as laser source 24 and included lensing component 36 are properly aligned with thin waveguide 22, coupling will be achieved.

Figure 7:
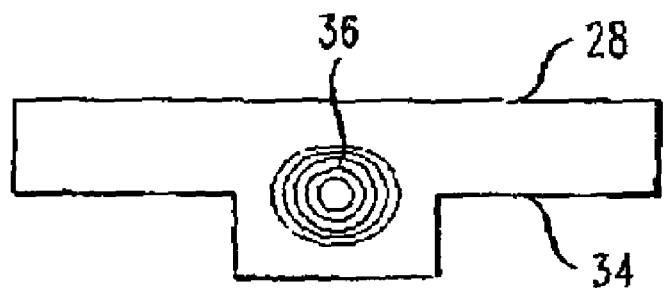
FIG. 7 is a side view of an exemplary lensing fixture of the invention, showing in particular the configuration of the reference surface and associated lensing component.

In accordance with the present invention, therefore, reference surface 34 of lensing fixture 28 is designed, in conjunction with the position of lensing component 36, so that when surface 34 is positioned within deep trench 30, alignment will be achieved. FIG. 7 is a side view of lensing fixture 28, showing in particular the configuration of reference surface 34 and associated lensing component 36. In the particular embodiment as illustrated in FIG. 6, an optical tap 50 is utilized to determine the degree of alignment that has been achieved between laser source 24 and thin waveguide 22. In particular, a coupling waveguide 52 is disposed adjacent to a portion of thin waveguide 22 so as to extract a portion of the propagating optical signal. An optical power monitor 54 (for example, a photodiode) is used to measure the power in the propagating signal and use this value to determine if maximum coupling efficiency has been achieved. This measurement may be used, for example, to adjust the position of lensing fixture 28 within deep trench 30 (as shown by the double-ended arrow) until maximum coupling efficiency is obtained. Various types of active optical alignment arrangements exist in the art and may be used to effectuate this alignment process. Optical power monitor 54 may also used for feedback/control of laser source 24.

Figure 8:
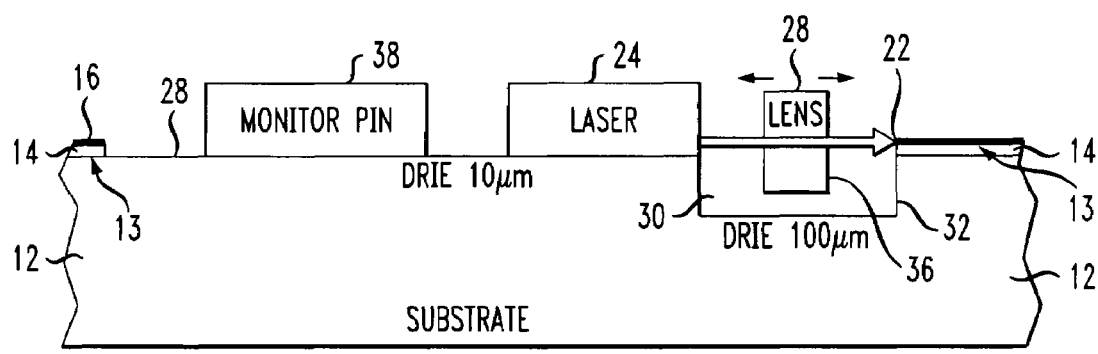
FIG. 8 is a side view of the laser coupling arrangement of the present invention, illustrating the optical output from a laser source 24 as passing through a lensing component and being focused into a thin SOI waveguide.

FIG. 8 is a simplified side view of the laser coupling arrangement of the present Invention, in this case illustrating the optical output from laser source 24 as passing through lensing fixture 28 and being focused into thin waveguide 22. Waveguide 22 contains, at its entrance point, an optical mode converter to properly couple the free space (three-dimensional) signal into a one-dimensional signal for propagation along waveguide 22. The mode converter can be constructed by adiabatically narrowing the width of the waveguide from its nominal value (e.g., 0.5 μm) to a more narrow width at the termination of waveguide 22 (e.g., 100 nm). This adiabatic taper will convert the mode field diameter of the wider portion of waveguide 22 from approximately 0.5 μm to a value in the range of 0.75-5.0 μm at the narrow tip termination of waveguide 22 (the variation a function of the actual dimensions of the tip and the optical wavelength(s) being used). Depending on the performance requirements for various applications, such a mode converter may be required for either fiber-based or laser-based coupling arrangements. Evident in this view is both shallow trench 26 (used to Support laser source 24 and, possibly, backface monitor 38) and deep trench 30 (used to support lensing fixture 28). It is evident in this view that the focal point of lensing component 36 can be adjusted to achieve maximum coupling by moving lensing fixture 28 backward or forward within trench 30 (as shown by the arrows in FIG. 8).

Figure 9:
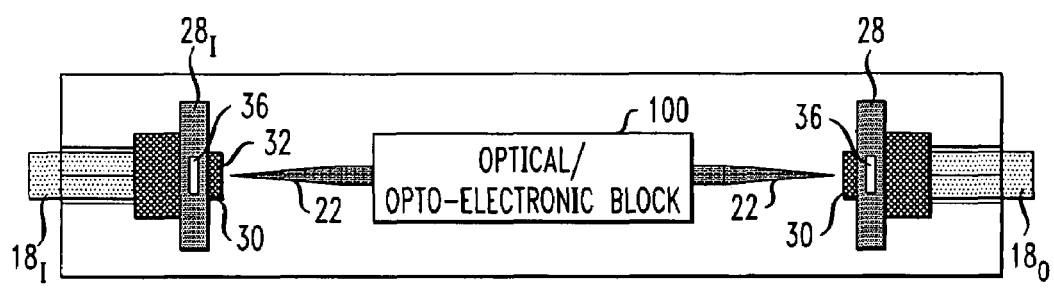
FIG. 9 is a top view of an exemplary arrangement of the present invention in the form of both an input coupling arrangement and an output coupling arrangement.

As mentioned above, it is possible to use the coupling arrangement of the present invention as either an input coupler to a thin waveguide or an output coupler from a thin waveguide. FIG. 9 is a top view of an exemplary arrangement of the present invention in the form of both an input coupling arrangement and an output coupling arrangement, in this example, an input fiber 18, is disposed to align with an input lensing fixture $28_I$, using a silicon alignment block (not shown) in the manner described above. The output from lensing fixture $28_I$ is focused into thin waveguide 22, which is an input to an optical/opto-electronic block 100 formed within the SOI structure. Block 100 may include a variety of different active and/or passive optical devices, where the output from block 100 is then coupled into an output section of thin waveguide 22, and directed through an output lensing fixture $28_O$ and into output fiber $18_O$.

From the invention thus described, it will be obvious that the embodiments of the present invention may be varied in many ways. Such variations are not to be regarded as a departure from the spirit and scope of the invention, and all such modifications as would be obvious to one skilled in the art are intended for inclusion within the scope of the invention as defined by the following claims.

What is claimed is:

1. An arrangement for providing optical coupling to/from a relatively thin silicon waveguide formed in an upper silicon layer (SOI layer) of a silicon-on-insulator (SOI) structure comprising a silicon substrate, an overlying buried oxide layer and the upper silicon layer (SOI layer), the thin silicon waveguide formed to include an endface termination at a deep trench formed through a portion of the thickness of the SOI structure into the silicon substrate, the coupling arrangement comprising:

a lensing component for coupling a propagating optical signal into/out of the endface termination of the thin silicon waveguide;

a reference plane defined at the interface between adjacent layers of the SOI structure; and a lensing fixture for supporting the lensing component, the lensing fixture attached to the SOI structure along the deep trench for providing focusing alignment between said thin silicon waveguide endface and said lensing component; and wherein the endface termination of the thin silicon waveguide comprises a nanotaper.

2. An arrangement as defined in claim 1 wherein the arrangement is utilized in conjunction with an optical transmitting device, the optical transmitting device disposed upon a relatively shallow trench formed through the SOI layer into the silicon substrate, the lensing fixture including a reference surface of a dimension sufficient to span the width of said deep trench and provide optical alignment between said lensing component and said endface termination of said thin silicon waveguide.

3. The arrangement as defined in claim 2 wherein the lensing fixture comprises a silicon component.

4. The arrangement as defined in claim 2 wherein the shallow trench and deep trench are formed using a reactive ion etching process.

5. The arrangement as defined in claim 2 wherein the arrangement further comprises an active alignment element the adjusting the position of the lensing fixture with respect to the waveguide endface termination to provide maximum coupling efficiency.

6. The arrangement as defined in claim 5 wherein the active alignment element comprises a tap-out waveguide disposed adjacent to a section of the thin silicon waveguide so as to out-couple a portion of the propagating signal and a photodetector coupled to receive the optical signal propagating along the tap-out waveguide and generate therefrom a control signal fix adjusting the position of the lensing fixture along the deep trench until maximum coupling efficiency is achieved.

7. An arrangement as defined in claim 1 wherein the arrangement is utilized in conjunction with an optical fiber, the arrangement further comprising an alignment block including a top major surface, the alignment block including a trench formed through the top major surface to hold the optical fiber such that the fiber core is aligned with said top major surface, the alignment block mated with the SOI structure such that said top major surface is attached to the SOI structure so as to align the optical fiber core with the endface termination of the thin silicon waveguide.

8. The arrangement as defined in claim 7 wherein the optical fiber includes a lensed endface as the lensing component for coupling into/out of the thin silicon waveguide endface termination.

9. The arrangement as defined in claim 7 wherein the alignment block further comprises a deep trench formed at an end termination of the trench that supports the fiber endface for supporting a separate leasing component.

10. The arrangement as defined in claim 7 wherein the alignment block comprises silicon.

11. The arrangement as defined in claim 1 wherein the relatively thin silicon waveguide comprises sub-micron dimensions.

12. The arrangement as defined in claim 11 wherein the endface termination of the sub-micron dimensioned waveguide is configured to provide polarization independent coupling.

13. The arrangement as defined in claim 1 wherein the buried oxide layer comprises a thickness of no greater than three microns.

14. The arrangement as defined in claim 1 wherein the interface between the silicon substrate and the buried oxide layer is used as the reference plane for the alignment arrangement.

15. The arrangement as defined in claim 1 wherein the optical coupling is provided between an input optical signal and a thin silicon waveguide.

16. The arrangement as defined in claim 1 wherein the optical coupling is provided between a thin silicon waveguide and an output optical fiber.

17. The arrangement as defined in claim 7 wherein the alignment block trench exhibits a V-groove geometry.

18. The arrangement as defined in claim 1 wherein the lensing component is monolithically integrated within the tensing fixture.

* * * * *

UNITED STATES PATENT AND TRADEMARK OFFICE
CERTIFICATE OF CORRECTION

PATENT NO. : 7,415,184 B2  Page 1 of 1
APPLICATION NO. : 11/652348
DATED : August 19, 2008
INVENTOR(S) : Ghiron et al.

It is certified that error appears in the above-identified patent and that said Letters Patent is hereby corrected as shown below:

Column 4, line 21    Error: "sufficent"
                     Correct text: "sufficient"

Column 7, line 31-32 Error: "...alignment element the adjusting the position..."
                     Correct text: "...alignment element for adjusting the position..."

Column 7, line 41    Error: "...signal fix adjusting..."
                     Correct text: "...signal for adjusting..."

Column 8, line 16 claim 9   Error: "leasing"
                            Correct text: "lensing"

Column 8, line 44 claim 19  Error: "tensing"
                            Correct text: "lensing"

Signed and Sealed this

Eleventh Day of August, 2009

David J. Kappos
*Director of the United States Patent and Trademark Office*